R. WINANS.
Locomotive Steam Engine.
No. 308.
6 Sheets—Sheet 1.
Patented July 29, 1837.
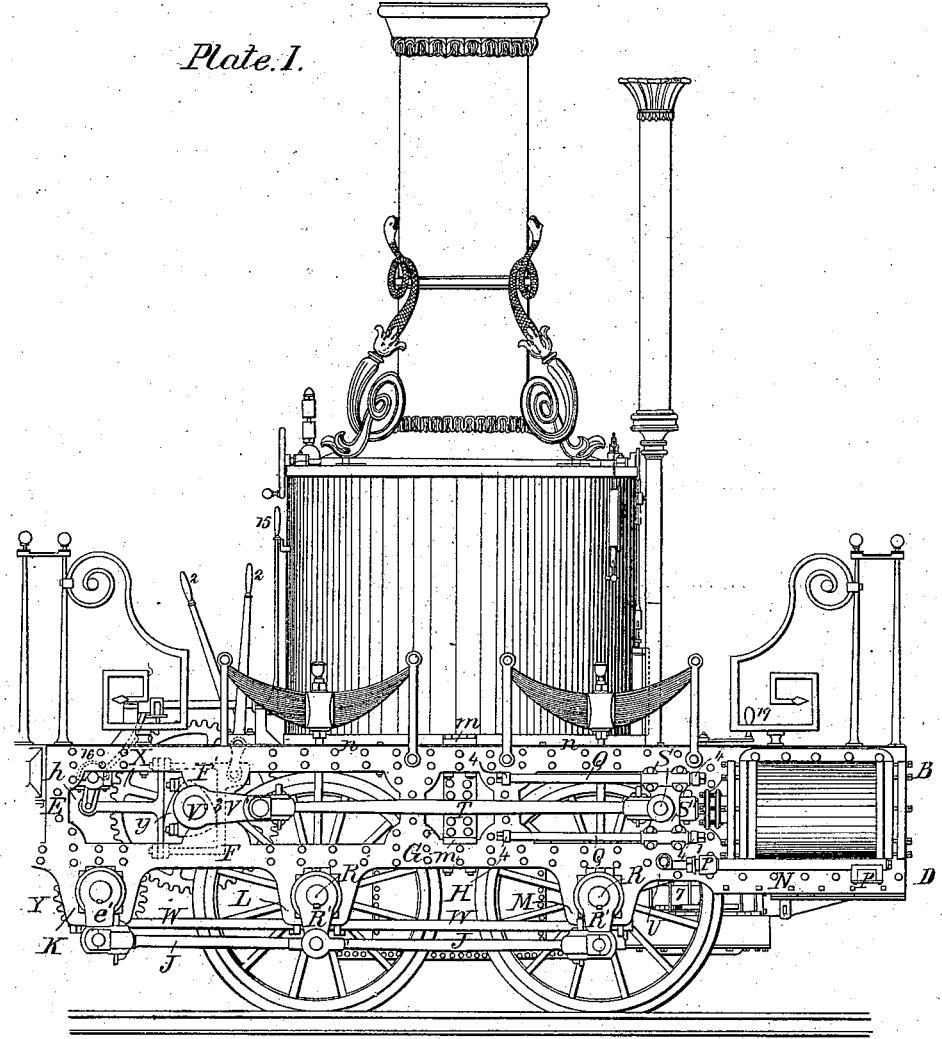
Plate. 1.

R. WINANS.
Locomotive Steam Engine.
No. 308.
6 Sheets—Sheet 2.
Patented July 29, 1837.
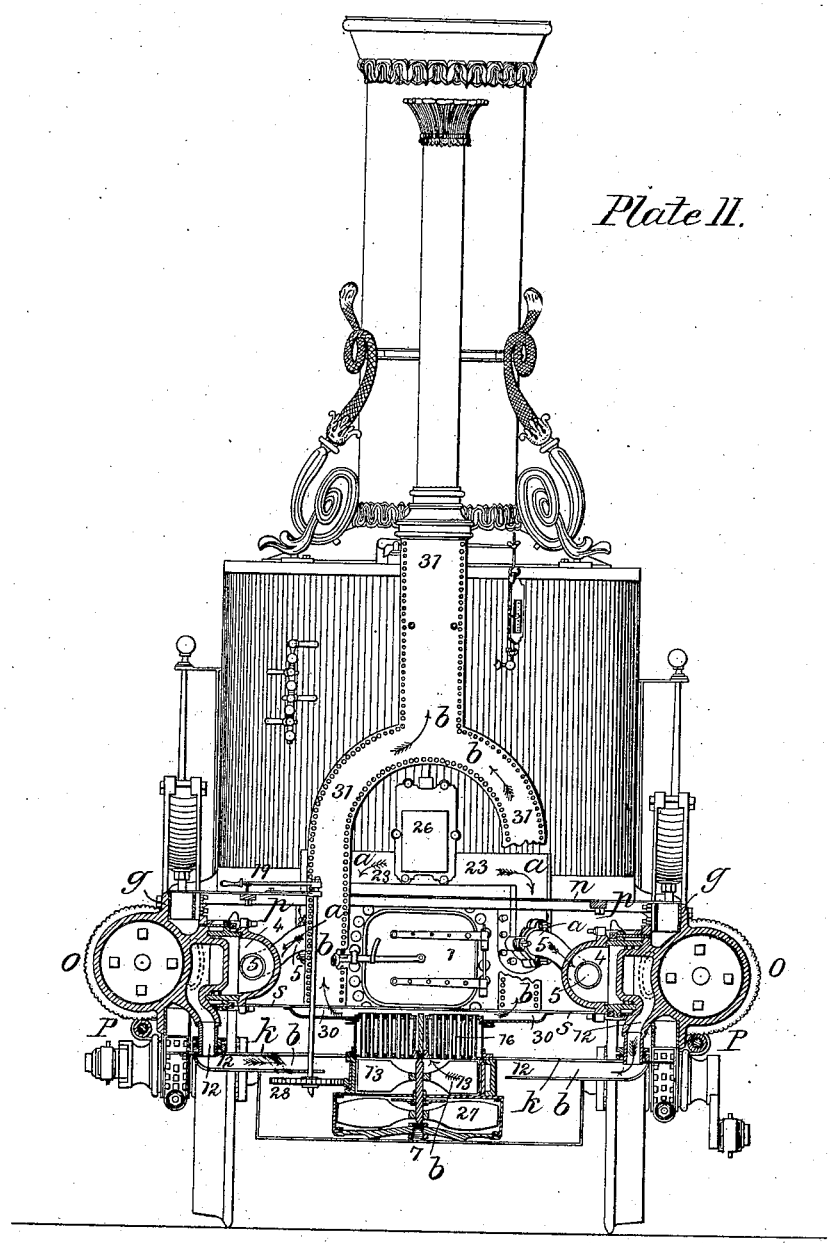
Plate II.

R. WINANS.
Locomotive Steam Engine.
6 Sheets—Sheet 3.
No. 308.
Patented July 29, 1837.
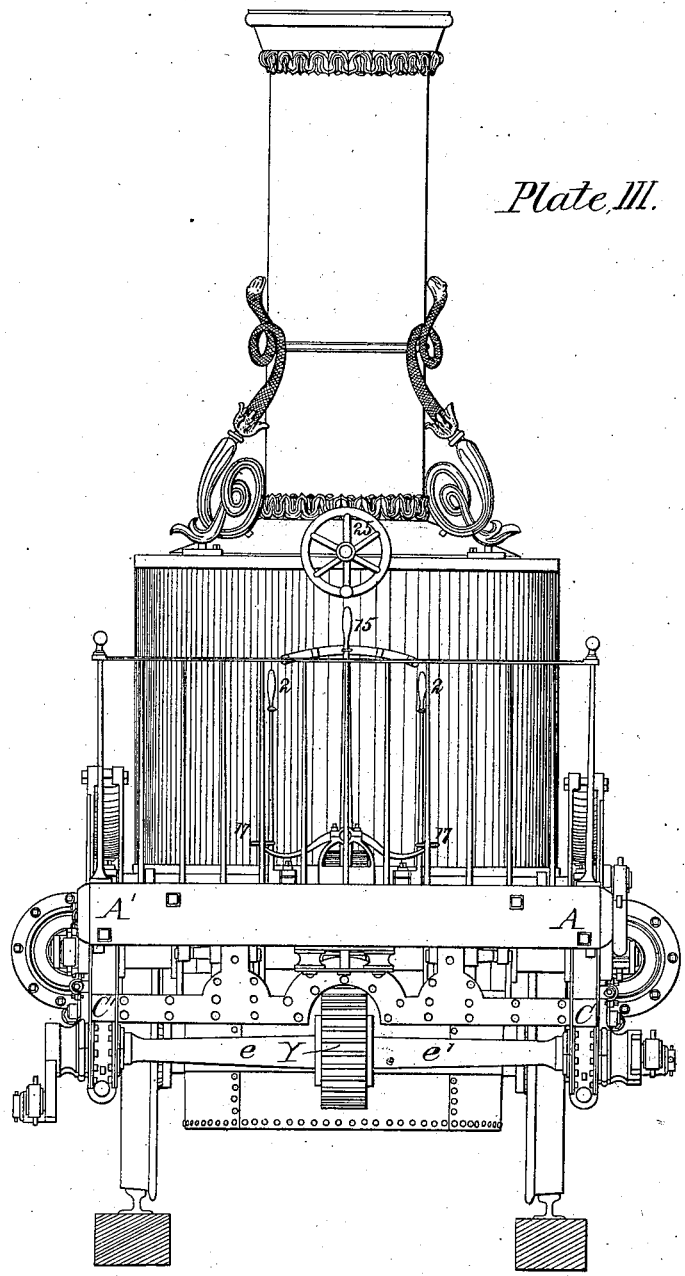
Plate. III.

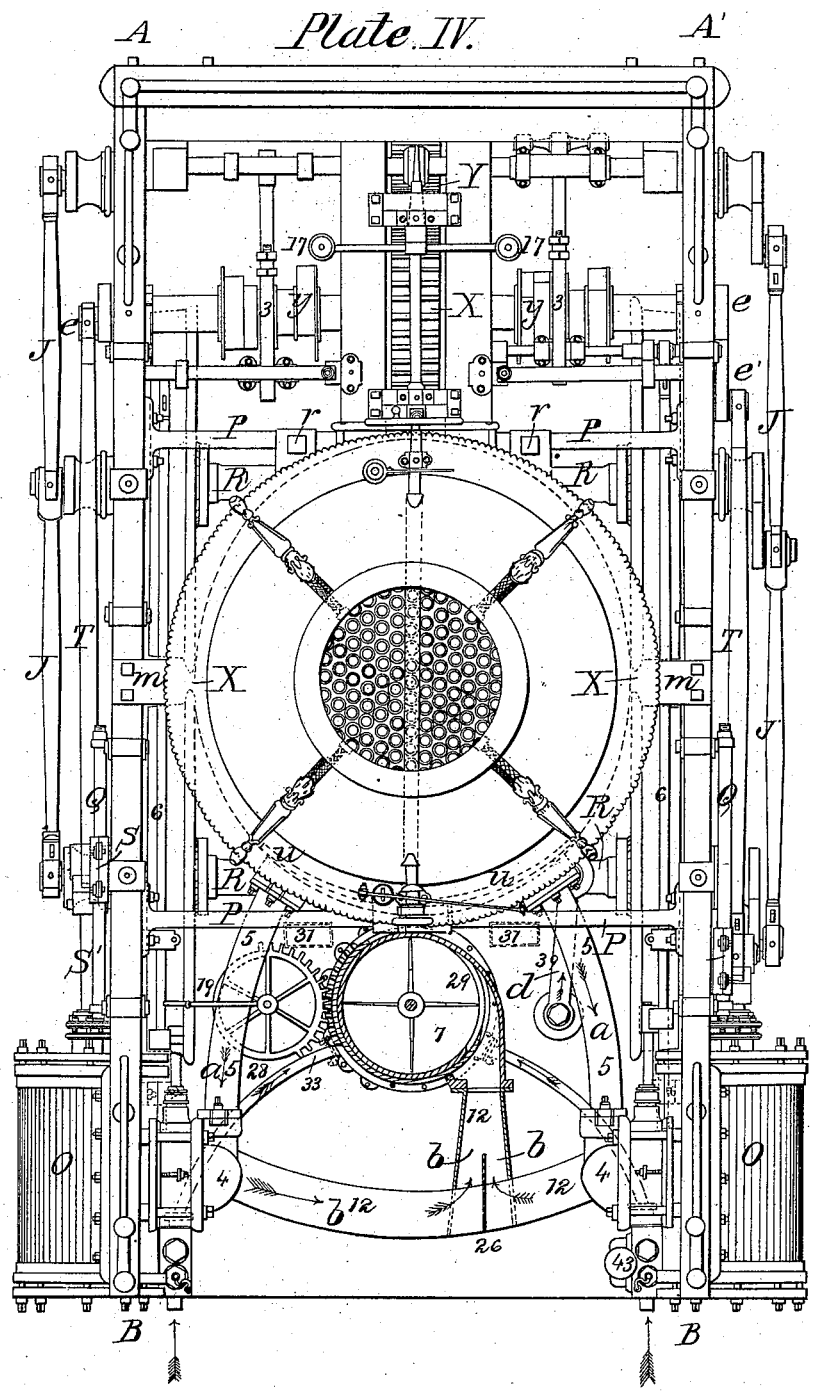

R. WINANS.
Locomotive Steam Engine.
No. 308.
6 Sheets—Sheet 5.
Patented July 29, 1837.
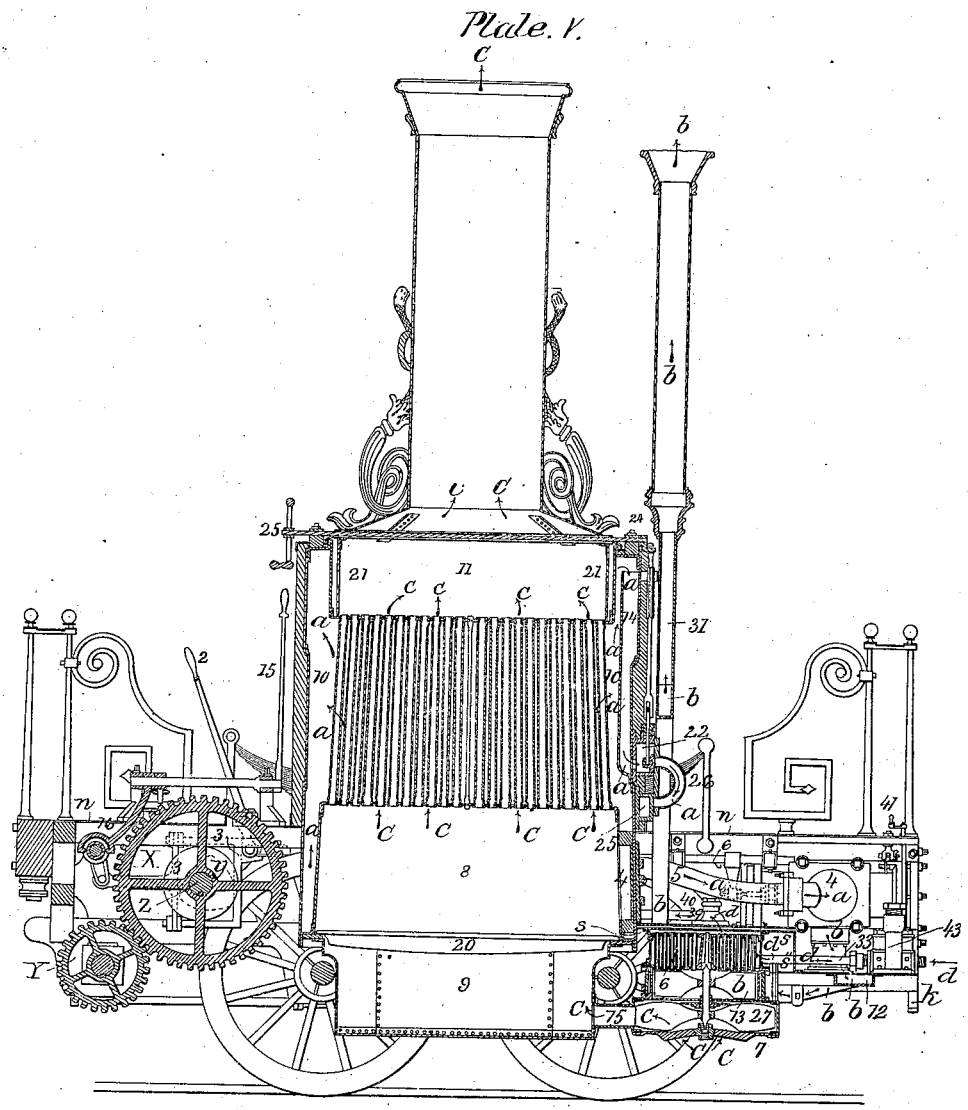

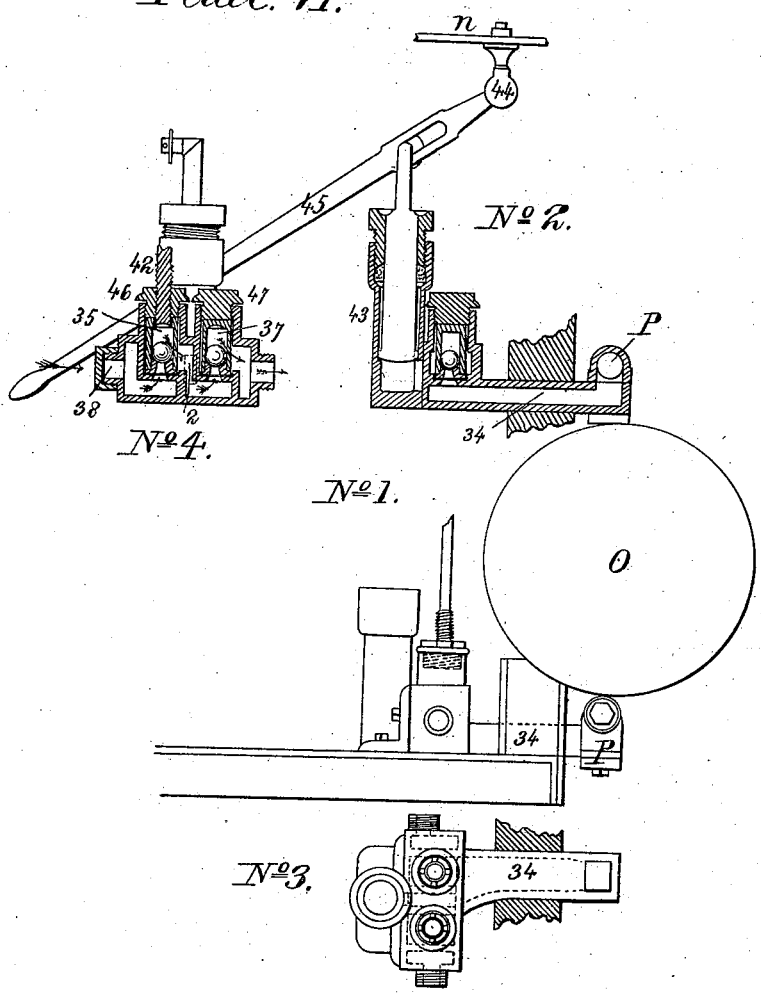

UNITED STATES PATENT OFFICE.

ROSS WINANS, OF BALTIMORE, MARYLAND.

LOCOMOTIVE STEAM-ENGINES.

Specification of Letters Patent No. 308, dated July 29, 1837.

*To all whom it may concern:*

Be it known that I, ROSS WINANS, of the city of Baltimore, in the State of Maryland, have invented a new and Improved Mode of Constructing Locomotive Steam-Engines; and I do hereby declare that the following is a full and exact description thereof.

The English locomotive steam engine, in its principal features, consists ordinarily, as is well known, of an horizontal tubular boiler, which supplies two cylinders attached to it, either mediately or immediately, and whose axes are either parallel or at a very small angle with the axis of the boiler, and whose piston rods are connected by pitmen or other contrivances, either with cranks on the axle trees, or crank pins on the spokes of one of the pairs of wheels. The pair of wheels to which the power is thus applied vary in diameter between four and five feet. The other pair, or set of wheels (except where the power is applied to all the wheels by means of side- or connecting rods, which is not often the case, but which requires all the wheels of the engine to be of the same size,) are of much less diameter, and run ahead, which renders the engine, when in motion, less apt to leave the track than if the forward wheels were of the large diameter of the driving wheels. Among the advantages of the English engine, as now arranged, are those arising from the center of gravity being brought near the rails, and from the stroke of the piston being exactly, or very nearly in the direction of the motion of the engine, and at right angles, or nearly so, with the motion of the springs that support the machinery on the wheels, instead of corresponding therewith, both of which are important requisites in obtaining a uniform, steady and direct motion of the engine on the rails, particularly at very high velocities. Along with these evident advantages in the arrangement of the English engine, there were found to be drawbacks to its use on a curved and undulating road growing out of the size and distance apart of its wheels, its want of power in the generation of steam, the destruction of the tubes in the boiler, by the action of the fire, and the difficulty of applying the power to all the wheels and yet retain such a diameter as to afford the required speed.

The engines used by the Baltimore and Ohio Railroad Company, now ordinarily known as the Baltimore engine, were intended to obviate the objections to the English engine. They have vertical tubular boilers and vertical cylinders attached to the front part of the boiler. The piston rods work on lever beams, one end of each of which is fastened to the top of the boiler, and the other end connected by pitmen to the cranks, by which revolving motion is given to the wheels. These cranks, however, and this has been a distinguishing feature of these engines heretofore, instead of being on the axle of one pair of the wheels, or formed by crank pins on the wheels themselves, as in the English engine, are at the ends of the axle of a spur wheel, which works into a pinion wheel on a shaft, or third axle, extending across and beyond the side pieces of the carriage, and furnished with cranks at its extremities, that are connected by proper rods to similar cranks on the projecting extremities of either one or both of the axles of the bearing wheels of the machine, which in this manner are made to revolve. The four bearing wheels of the Baltimore engine are of the same size, and about three feet in diameter, and as ordinarily geared, make two revolutions for each double stroke of the piston, the number of teeth in the spur wheel being double the number in the pinion wheel. The fire is urged by a fan wheel, propelled by the exhaust steam from the cylinders, by means of which a blast of more or less intensity is produced at pleasure, and the quantity of steam generated regulated thereby, as patented by Phineas Davis under date of July 29th in the year eighteen hundred and twenty-four.

Among the peculiar advantages of the Baltimore engine may be enumerated its capacity to use anthracite coal as fuel with perfect efficiency, the superior evaporating power of the boiler, and the greater durability of the tubes therein, all of which qualities are attributable chiefly to the vertical position of the boiler, which admits of a larger fireplace than the English horizontal boiler can conveniently afford, as well as a greater number of tubes, the Baltimore engine having as many as four hundred and fifty, while the number in the English engine rarely exceeds one hundred and twenty, thus making it practicable to use much larger cylinders and so increasing the efficiency of the engine on undulating roads, by enabling it to take a greater load in proportion to its weight. The vertical position of the boiler also produces a better and more rapid circulation of the water in it, and so affords a better protection to the parts most exposed to injury from the heat, than has been obtained where the boiler is horizontal. Another and peculiar advantage of the Baltimore engine is obtained by the use of the third axle or shaft, ranging with the axles of the road wheels, and transmitting the propelling power to them as before described, whereby the jar of the bearing wheels being lost in the connecting rods, is prevented from affecting materially the cylinders, pistons, gearing and so forth, which, together with the shafts, are sustained on the springs of the engine. In the English engine the head of the piston rod is connected at once by a pitman with the crank on the axle of the bearing wheels. Again, the use of a large spur wheel, and a small pinion wheel, makes it practicable to employ small bearing wheels, without losing velocity, so that the wheels being brought close together, a curved road with radii not exceeding four hundred feet, that would be impracticable for the five feet wheels of English engines, may be easily traveled upon. Besides this, the adhesion of all the wheels of the Baltimore engine being used by applying the power to all, it becomes easy to divide the weight of the engine equally upon the wheels, while in the English engine, using the adhesion of but one pair of wheels, the greater part of the weight is made to rest on the driving pair of wheels, to produce sufficient adhesion to make effective the steam-power of the machine. But the many different advantages thus enumerated as resulting from the use of the vertical boiler, and the arrangement of the engine connected with it, have been attended heretofore with a loss of the important advantages above mentioned, as belonging to the English engine. The center of gravity, owing to the position of the boiler and the heavy parts of the engine, the cylinders, working beams, and the attendant fixtures, slides and pitmen, was, of course, much higher than in the English engine, at a sacrifice of steadiness of motion, that was further sacrificed by the action of the pistons and other parts of the machinery having a reciprocating motion at right angles with the movement of the engine, and in the direction of the action of the springs, or nearly so, whereby a vibration upon the springs was produced that would cause the Baltimore engine to become at very high velocities alarmingly unsteady, so that indeed it would seem to bounce, rather than roll, along the rails.

My invention consists of an arrangement, by which I combine the prominent advantages and best qualities of both the engines here described, while I get rid of the objections here enumerated, as belonging to them respectively, so as to produce a machine, which, to the steadiness of the English engine, proceeding from the lowness of its center of gravity and the horizontal action of its pistons, unites the great power of the Baltimore engine, the durability and capacity to generate steam, of its boiler, its adaptation to undulating roads, proceeding from its power, and the adhesion of all the wheels, and to curved roads, proceeding from the size of its bearing wheels,—its ability to use anthracite coal as a fuel, and the freedom of the machinery from the jar of the bearing wheels, owing to the use of the pinion wheel and shaft, or third axle, through which the propelling power is communicated to the road wheels; the vertical boiler, the spur and pinion wheels, the third axle, the small wheels and the blowing apparatus of the Baltimore engine, together with their peculiar advantages, I preserve; but I combine with them, horizontal cylinders, with pistons moving parallel to the direction of the engine on the rails; and, by my arrangement for using horizontal cylinders and a lower position of the boiler, I put down the center of gravity of the entire machine as near the rails as in the horizontal English engine herein before described. It is for this combination, made by me for the first time, that I claim a patent.

In the Baltimore engine, heretofore used, the necessity of disposing of the weight, so as to rest equally upon the four bearing wheels, required, that the boiler and ash pan should be placed over one of the axles. This elevated the center of gravity high above the rails, the heaviest part of the machinery being attached to the boiler. In my improvement the boiler is placed in the center between the axles of the bearing wheels, as will be seen by reference to the accompanying drawings, parts of this specification, and sets much lower than it has heretofore done when used. The side pieces that sustain the boiler upon the wheels, and to which the greater part of the machinery is attached, (A, B, C, D,) are constructed in the manner described in the specification for "an improvement in the mode of constructing the side pieces of locomotive engines" for which I have, at the same time, that I file this specification, made application, for Letters Patent of the United States.

The boiler is fastened to the side pieces by strong iron knees, (m, m′, Figures 1 and 4,) that project on either side and rest upon the upper and lower rails of each side piece, and by knees, resting in like manner, (r, r, Fig. 4,) on the braces of iron, (p, p, Fig. 4,) connecting the two side pieces before and behind the boiler. The side pieces are connected also, in front with strong, iron plated framing, of a similar construction with the side pieces, as shown in the drawings Fig. 3. The boiler is further supported by a sheet iron floor, (n, n; Figs. 1, 5,) riveted fast to the boiler, and extending horizontally all around, so as to rest on the side pieces and the framing, joining them, and which floor, besides aiding the iron knees to support the boiler, resists any tendency in the side pieces to lose their parallelism, and keeps them, point for point, always exactly opposite to each other; so that, if one side piece, when in motion, was stopped or checked by striking against any thing, the weight of the other would not cause it to advance, twining the boiler, as it did so. In the annexed drawings, Fig. 1 represents a side view of the engine here described; n, n, is the edge of the sheet iron floor, and m, m, the ends of the knees resting upon the upper and lower rails of the side piece. At the end of the side piece A, C, Fig. 1, there is a vertical support or connection E, which is not used at the end B, D. In the opening of the side piece at B, D, the cylinder O is placed horizontally, and made fast by a flange g, Figs. 1, 2, that is cast on it, and which is bolted to the side piece on the upper and lower rail. The absence of an upright connection between B and D, allows the head of the cylinder to be taken off for the purpose of packing it.

Fig. 2 is the end view of the same engine, and represents a cross section through the cylinders. It will here be seen, that the flanges on the cylinders are so disposed, as to leave just so much of the cylinders projecting outside of the side pieces, as to permit the piston rod, and crank, to which it attaches, to play clear of them: and that the steam chest (4, Fig. 2) projects within the side piece, and receives the steam from the boiler by a short pipe (5, Figs. 2, 4, 5,) under the iron floor, (n, n,) aforesaid. Immediately in front of the cylinder (O, Fig. 1,) are the slide rods Q, Q, attached to the side pieces at 4, 4, 4, 4, and with a space between them and the side piece for the play of the cross head. S is the cross head, and S' the piston rod. The spur wheel shaft V, Fig. 1, which has heretofore in the vertical engines, when used, been sustained by a complicated fastening from the boiler, is here extended so as to be supported by, and revolve in boxes, fastened to the upright of the side piece at F, F'; and cranks at each end, (V, V',) at right angles with each other, are connected by the pitman T with the piston rod. The spur wheel X mashes into the pinion wheel Y, on the shaft that is supported on a level with the axles of the bearing wheels, at K; and the cranks on which, connecting with the cranks on the bearing wheels at L, and, if the adhesion of all four wheels is required, at M also, give motion to the engine on the rails. Were the cranks on the spur wheel shaft, and those on the bearing wheel axles and pinion wheel shaft in the same vertical plane, they would interfere and strike in their revolutions. They are therefore made to work in different vertical planes; the axle V, and crank V V', of the spur wheel shaft projecting about four inches from the side piece; and the axles e, R, R, and cranks e, e', R, R', of the pinion wheel shaft, and the bearing wheel axles, projecting nine inches, so that the cranks of the spur wheel shaft, as will be seen by inspection of Fig. 4, will perform their revolutions without coming in contact with the cranks of the pinion wheel shaft, or the cranks of the bearing wheel axles. The weight of the spur and pinion wheels and their respective shafts, in front of the boiler, balances the weight of the cylinders behind it, and the weight of the entire machine is thus equalized on the four wheels. the cams y, Figs. 1, 4, by which the slide valves in the steam chest are opened and closed for the entrance and exit of the steam from the boiler, are placed upon the spur wheel shaft, together with the cam yokes, (3, 3). These cams are of the description of those for which I have made application for Letters Patent of the United States, and enable me to cut off the steam at three-eighths, five eighths, or seven eighths of the stroke of the piston. The cam yokes are hung in such a manner, that they can be moved laterally by means of the lever 15, Figs. 1 and 3, and the treadles 17 Figs. 3 and 4, over any part of the cams; the arm 16, Figs. 1 and 5, sliding the cam yokes to the right or left, as may be desired. The connecting rods from the cam yokes to the slide valves in the steam chests pass between the boiler and side pieces, as shown at 6, 6, Figs. 4 and 5. The arc 18, Fig. 3, has notches cut in it, as represented in the drawing, which serve to retain the lever 15, (that has a strong spring in it, for the purpose,) in the position in which it is required to be placed, in regard to the cam, then in use in working the engine. In connection with the engine, I use a blowing apparatus, connected with a contrivance for heating the water, before it is pumped into the boiler, for which apparatus I am now preparing to apply for Letters Patent of the United States. This apparatus and contrivance (7, Figs. 1, 2, 4 and 5,) is placed between the cylinders, under the floor, on which the fireman stands, and which unites the lower parts of the two side pieces.

I have thus described the general arrangement of the engine, constructed by me, and propose now to describe the mode of its action, illustrating also thereby still further the details of its construction. I have already said, that the boiler used by me, is the vertical tubular boiler, the external appearance of which, is exhibited in the figures, and its internal construction shown in detail in Fig. 5. Hitherto this boiler, when used, has been circular; but in the engine, represented in the drawings, while it is circular at top, it is elliptical at bottom, as though, a boiler, circular at top and bottom, had been pressed at the bottom, so as to flatten somewhat two of its opposite sides. This will be seen at Fig. 4, where the dotted ellipsis is the outline of the bottom of the boiler, which, it will be seen also is just clear of the bearing wheels at X, X. Were the boiler not flattened at the sides, it would come in contact with the wheels, unless they were either smaller, or farther apart than represented in the accompanying drawings. With a view therefore, to have the boiler of the greatest capacity, and also to have the axles of the wheels close together, for the facility of running on a very curved road, and the wheels at the same time large,—with this view, it became necessary to flatten the sides of the boiler at the bottom, by which the desired objects were obtained. In Fig. 4, the dotted line $u, u,$ represents a part of the circular outline of the top of the boiler, and $x, x,$ the outline of the elliptical bottom.

In Fig. 5, which is a section of the engine longitudinally, $s, s', s'', k,$ represents the sheet iron floor, on which the fireman stands, which is made with a step in it, to accommodate the heater 16. The upper step is of double iron, as the drawing shows, to protect the step from the heat of the coals, in drawing the fire from the fire door 1. The fire is made on the grate 20 in the furnace 8, and the heated air and flame pass through the tubes, in the direction of the darts $c$, and escape by the chimney. The water in the boiler surrounds the furnace at $a, a,$ and the tubes up to the water line 10, 10, above which is the steam chamber, protected above the heads of the tubes from the heat by the cylinder of sheet iron 21. The steam passes into the pipe 14 which is formed by riveting a piece of iron to the inner side of the outer shell of the boiler, and from thence through the aperture, $a$ ⟶, into the box 22, containing the throttle valve, which is worked by a connecting rod, attached to the crank 24, at the end of the axle 24, 25, that is, in its turn, moved by the engine man with the wheel 25, (see Fig. 3.) To shield this rod from the fire, it passes through a tube of iron shown in Figs. 4 and 5. When the throttle valve is open, the steam passes through the semicircular pipe 26 into the pipe 23, see Figs. 2 and 5, thence into the pipes 5, 5, see Figs. 2 and 5, and thence into the steam chest 4, and into the cylinders O, O. Hitherto, the dart with the letter $a$ has indicated the course of the steam from the boiler to the cylinder; its course, after leaving the cylinder, is indicated by the dart with the letter $b$; and we see it passing from the eduction passage 12, Figs. 2, 4, 5, into the blowing apparatus 7, Figs. 1, 2, 4 and 5. This apparatus consists of two boxes, one of which contains the steam wheel 13, in communication with the eduction passage; the other the fan wheel 27, in communication with the open air, through openings underneath, and with the ash pan 9, through the passage 15, Fig. 5. Both the steam and fan wheels being on the same axle, they both turn at the same time, so that, while the steam is driving the steam wheel 13, the fan wheel 27 is forcing air into the ash pan, thereby creating in the furnace the necessary blast; it will be seen in Fig. 4, that the box containing the steam wheel 13, has around it a segment of a circle, part of which is cogged. This segment is, like the box, of iron, and both are turned and finished, so as to permit the smooth sliding of one on the other. The cog wheel 28 meshes into the segment; and, being turned by the lever 19 (Figs. 1, 2, 4,) causes the segment to shut or open the aperture 29, through which the steam operates on the steam wheel 13. When it is desired to increase the speed of the fan wheel, and consequently heighten the blast in the furnace, the handle 19 is moved to the right which lessens the aperture 29, and increases thereby the force with which the steam strikes the steam wheel. If the least amount of blast is required, the lever 19 is moved to the left, so as to open to its full extent the aperture 29, thereby lessening the force, with which the steam strikes against the steam wheel; so that the lever 19, which is close by the fireman, enables him, at pleasure, to regulate the fire in the furnace. Above the box, containing the steam wheel, is the heater 16, Figs. 2 and 5; through the tubes of which the steam from the steam wheel passes into the opening 30, Fig. 2; and thence by the pipes 31, into the open air. The office of the steam, in passing through the tubes 26, is to heat the water, before it is forced into the boiler. In Fig. 1, the position of the pumps is seen at P, which represents the barrel of the pump, the plunger of which is worked from the cross head at U.

The drawing Fig. 6 represents the operation of the pumps, where will be seen in No. 1, the cylinder O, and the pump barrel P, the latter connected through the side piece by the pipe 34, with the valve box of the pump. No. 4, Fig. 6, represents a section of the valve box, where Z is the aperture communicating with the pump barrel. When the plunger is drawn back, the effect is, to raise the ball in the valve 35, and admit the water from the tender at the opening 38. The return stroke of the plunger closes the valve 35, and raises the ball in the valve 37, forcing the water through the opening 38 into the pipe 33, Figs. 4, 5, and thence into the heater 16, where, coming in contact with the pipes, heated by the steam, as already mentioned, it acquires a portion of the heat of the steam, and consequently passes hot through the pipe 39, into the boiler. When it is desired to stop the supply of water, it is done by turning the small crank handle 41, Figs. 5 and 4 which turns the screw 42, Fig. 6, No. 4, down upon the ball in valve 35, and stops the action of the pump. This is better than the common mode of turning a cock on the tender, where the hose is attached. In order to work the pump by hand, there is a separate barrel 43, Figs. 4, 5, 6, the plunger of which is worked by a lever 45, Fig. 6, No. 2, that has its pivot 44, Fig. 6, No. 2, attached to the sheet iron floor n, Figs. 1, 2, 5, 6.

40, Figs. 4 and 5, is a valve, which, being screwed down, separates the pump valves from the boiler, so that, while the engine is in motion, they may be opened, by unscrewing the tops, 46, 47, Fig. 6, No. 4, and examined, should they be out of order, such as getting a chip or anything else from the water into them. The dart marked c represents the course of the air, used in the blast, and the dart marked d, the course of the water. The above description, in connection with the drawings, will it is believed, enable any one, acquainted with machinery, to understand and construct such an engine, as I claim to have invented.

In the vertical engine with vertical cylinders, the constant effort, with every stroke of the piston, to tear the parts of the engine asunder, is so great, as to render it extremely difficult, to fasten the boiler, and to brace it sufficiently to resist the tendency, it has under the circumstances, to spring, yield, and finally get loose. Here, on the contrary, the stroke is in the direction of the fiber of the wood, to which the cylinders are attached, and where the iron casing affords the strongest resistance; and the fastenings are so simple and efficient, as to forbid the idea of their being broken or injured by the action of the machinery. From the foregoing in will be seen, that I have accomplished the end proposed; combined the advantages of the two engines first described,— in one and the same engine, and arranged all the different parts of the machine, in conformity therewith.

What I claim as new, and for which I ask an exclusive privilege, is—

1. The combination of the vertical boiler herein described, with the horizontal position of the cylinders.

2. The combination of the vertical boiler and the horizontal position of the cylinders; or the horizontal position of the cylinders alone, with the spur and pinion wheel and shaft, or third axle, as above described.

3. The arrangement of the machinery generally and combination of its several parts, producing the engine above described.

I am perfectly aware, that the vertical boiler is not my invention, neither is the horizontal position of the cylinders; but the combination of the boiler herein described with the horizontal cylinder, so as to obtain the respective advantages of each in the same machine, I believe to be my invention and new, and I therefore claim this combination. I am also aware, that the spur and pinion wheel shafts have been used before in combination with a vertical boiler and vertical cylinders, but never in combination with a vertical boiler and horizontal cylinders combined; such combination I believe to be my invention and new, and I also claim it; as also the combination of the spur and pinion wheel shafts with horizontal cylinders, whether the boiler used, be vertical or horizontal, which combination I believe to be my invention and new. Engines may be made of various proportions on the above plan. The dimensions, I at this time prefer, are those, represented in the accompanying drawings, which are drawn to a scale of ¾ of an inch to a foot.

ROSS WINANS.

Witnesses:
 THOS. P. JONES,
 CLEMENT S. FOOTE.